United States Patent
Raff et al.

(10) Patent No.: US 7,755,322 B2
(45) Date of Patent: Jul. 13, 2010

(54) MECHANICAL COUPLING SYSTEM, ASSOCIATED ELECTRICAL SUPPLY UNIT, AND ASSOCIATED CHARGING DEVICE

(75) Inventors: Thomas Raff, Dettenhausen (DE); Marcin Rejman, Waiblingen (DE); Daniel Hirt, Kirchentellinsfurt (DE)

(73) Assignee: Robert Bosch GmbH, Stuttgart (DE)

( * ) Notice: Subject to any disclaimer, the term of this patent is extended or adjusted under 35 U.S.C. 154(b) by 569 days.

(21) Appl. No.: 11/696,029

(22) Filed: Apr. 3, 2007

(65) Prior Publication Data
US 2007/0236176 A1 Oct. 11, 2007

(30) Foreign Application Priority Data
Apr. 7, 2006 (DE) .................. 10 2006 017 993

(51) Int. Cl.
*H02J 7/00* (2006.01)
(52) U.S. Cl. .................................. 320/114; 320/107
(58) Field of Classification Search ................. 320/107, 320/110, 111, 112, 113, 114, 115; 307/150; 439/500; D13/103, 107, 108; 429/96, 97, 429/99, 100
See application file for complete search history.

(56) References Cited
U.S. PATENT DOCUMENTS
5,208,525 A 5/1993 Lopic

| | | | | |
|---|---|---|---|---|
| 6,346,793 B1 * | 2/2002 | Shibata et al. | ............... | 320/113 |
| 7,064,520 B2 * | 6/2006 | Heigl et al. | ............... | 320/114 |
| 7,176,656 B2 * | 2/2007 | Feldmann | ............... | 320/114 |
| 7,554,287 B2 * | 6/2009 | Duesselberg | ............... | 320/107 |
| 2004/0135542 A1 * | 7/2004 | Ito | ............... | 320/107 |
| 2006/0001400 A1 * | 1/2006 | Zedell et al. | ............... | 320/107 |
| 2006/0164036 A1 * | 7/2006 | Ulla et al. | ............... | 320/114 |

FOREIGN PATENT DOCUMENTS
JP 2005-011715 1/2005

* cited by examiner

*Primary Examiner*—Edward Tso
*Assistant Examiner*—M'Baye Diao
(74) *Attorney, Agent, or Firm*—Michael J. Striker

(57) ABSTRACT

A system is provided for mechanically coupling an electrical supply unit for cordless electrical devices with a charging device, the electrical supply unit includes a housing in which at least one battery that can be recharged by the charging device is located, an associated electrical supply unit, and an associated charging device. At least one guide element is located in the front region of the housing of the electrical supply unit, which engages, for mechanical coupling with the charging device, in a corresponding receiving device on the charging device; the combination of the at least one guide rail and the receiving device functions as a flexible coupling or a slide-in, rear-engagement seat.

15 Claims, 2 Drawing Sheets

MECHANICAL COUPLING SYSTEM, ASSOCIATED ELECTRICAL SUPPLY UNIT, AND ASSOCIATED CHARGING DEVICE

CROSS-REFERENCE TO A RELATED APPLICATION

The invention described and claimed hereinbelow is also described in German Patent Application DE 102006017993.5 filed on Apr. 7, 2006. This German Patent Application, whose subject matter is incorporated here by reference, provides the basis for a claim of priority of invention under 35 U.S.C. 119(a)-(d).

BACKGROUND OF THE INVENTION

The present invention is based on a system for mechanical coupling, an electrical supply unit, and a charging device.

U.S. Pat. No. 5,208,525 describes an electrical supply unit for the cordless operation of electrical devices. The electrical supply unit described includes a holder fastened to the electrical device for holding a current accumulator unit in an easily detachable and essentially ent rely exposed manner. For the electrically conductive contact connection, the accumulator unit includes flat, rigid touch contacts that lie on a recessed contact surface, the corresponding touch contacts of which are located in the region of the corresponding contact surface of the holder. The touch contacts are located close to a hinge axis formed by a projecting hinged cam and a cam pocket between the accumulator unit and the holder, thereby resulting in favorable mechanical advantage. For detachable locking, two locks that can be actuated separately and simultaneously are provided in the region of the other end of the accumulator unit which accommodates the holder in a manner such that it is nearly entirely recessed.

The electrical supply unit is coupled with a charging device in order to charge at least one rechargeable battery, which is located in a housing of an electrical supply unit for cordless electrical devices. It is also known from the related art that, in order to charge the at least one rechargeable battery, the rechargeable battery pack is separated from the electrical device or it remains connected with the electrical device. If the electrical supply unit is permanently integrated in the electrical device, the electrical device can be placed on the charging device, where it is held in place by gravity.

SUMMARY OF THE INVENTION

Accordingly, it is an object of the present invention to provide a mechanical coupling system, an associated electrical supply unit, and an associated charging device which are further improvement of the existing solutions.

In keeping with these objects and with others which will become apparent hereinafter, one feature of the present invention resides, briefly stated in a system for mechanically coupling an electrical supply unit for cordless electrical devices which a charging device, with which the electrical supply unit includes a housing in which at least one battery is located that is rechargeable by the charging device, the system has at least one guide rail locatable in a front region of the housing which engages, for mechanical coupling with the charging device in a corresponding receiving device on the charging device, said guide rail and said receiving device being configured so that they function in a combination as an element selected from the group consisting of a flexible coupling and a slide-in, rear-engagement seat.

Another feature of the present invention resides, briefly stated, in an electrical supply unit for cordless electrical devices with the housing in which at least one rechargeable battery is located, the electrical supply unit comprising at least one guide rail located in a front region of the housing and engaging for mechanical coupling into a corresponding receiving device on a charging device, said at least one guide rail and said receiving device being formed so that they function in combination as an element selected from the group consisting of a flexible coupling and a slide-in rear-engagement seat.

Still a further feature of the present invention resides, briefly stated, in a charging device for an electrical supply unit for cordless electrical devices, comprising a receiving device into which at least one guide element located on the electrical supply unit engages to mechanically couple the electrical supply unit with a charging device, said at least one guide element and said receiving device being configured so that they function in combination as an element selected from the group consisting of a flexible coupling and a slide-in rear-engagement seat.

The inventive system for mechanical coupling an electrical supply unit for cordless electrical devices with a charging device has the advantage that at least one guide rail is located in the front region of the device, which engages in a corresponding receiving device on the charging device to provide mechanical coupling with the charging device; the combination of the at least one guide rail and the receiving device functions as a flexible coupling or a slide-in, rear-engagement seat.

The inventive coupling system advantageously provides the supply unit—which is coupled with the charging device—with greater stability and a much better hold on the charging device, while ensuring easy handling. A guide rail in the front region of the housing of the supply unit serves to center the supply unit on the charging device. The guide rail—as part of the flexible coupling or the slide-in, rear engagement seat—absorbs a portion of the acting forces.

The guide rail also advantageously prevents the supply unit from tipping laterally or backward.

The inventive electrical supply unit for cordless electrical devices advantageously includes at least one guide rail in the front region of its housing, which engages in a corresponding receiving device on a charging device for mechanical coupling.

The inventive charging device for an electrical supply unit advantageously includes a receiving device, into which at least one guide rail located in the front region of the electrical supply unit engages to mechanically couple the electrical supply unit with the charging device; the combination of the at least one guide rail and the receiving device functions as a flexible coupling or a slide-in, rear-engagement seat.

Particularly advantageously, the at least one guide rail and the corresponding receiving device are designed such that the flexible coupling allows a swiveling motion to be carried out from a starting position downward into an end position, and from the end position upward into the starting position. This results in easy handling when coupling the electrical supply unit with the charging device. Before being coupled with the charging device, the electrical supply unit can be separated from the electrical device or it can remain connected with the electrical device, depending on the design of the supply unit and/or the arrangement of the electrical contacts for establishing electrical contact between the supply unit and the charging device.

The mechanical coupling of the electrical supply unit with the charging device via the flexible coupling takes place by inserting the at least one guide rail of the electrical supply unit into the corresponding receiving device of the charging device, in the starting position, and then swiveling the supply unit from the starting position downward into the end position. The end position is reached, e.g., when a housing base of the supply unit comes in contact with a surface of a recess in the charging device.

The electrical supply unit is advantageously held in the end position by a spring contact force, in the manner of a ski binding. Advantageously, the spring that applies the spring contact force is designed to deflect to the extent that the guide rail can disengage from the receiving device in reaction to a sudden force, e.g., when the charging device—together with the electrical supply unit—is dropped and lands on a hard surface, and the housing of the supply unit can become detached from the charging device, thereby ensuring that neither the housing nor the charging device are damaged due to a rigid connection or coupling of the supply unit with the charging device. The spring contact force is advantageously produced by an electrical contact spring, which is acted upon by an actuating element located on the housing of the electrical supply unit. In addition, the electrical supply unit and the charging device are in electrical contact with each other in the end position, thereby ensuring that the batteries of the electrical supply unit are charged.

The present invention further relates to a system for mechanically coupling an electrical supply unit for cordless electrical devices with a charging device. The electrical supply unit is located in a housing in which at least one battery is located that can be recharged by the charging device. The housing includes at least one guide element that engages, for mechanical coupling with the charging device, in a corresponding receiving device on the charging device. The combination of the at least one guide rail and the receiving device functions as a flexible coupling or a slide-in, rear-engagement seat. A guide rail is advantageously provided as the guide element.

The present invention further relates to an electrical supply unit for cordless electrical devices with a housing in which at least one rechargeable battery is located. The housing includes at least one guide element that engages, for mechanical coupling, in a corresponding receiving device on the charging device. The combination of the at least one guide rail and the receiving device functions as a flexible coupling or a slide-in, rear-engagement seat. A guide rail is advantageously provided as the guide element.

The present invention further relates to an electrical supply unit for cordless electrical devices with which a receiving device, into which at least one guide element located on the electrical supply unit engages to mechanically couple the electrical supply unit with the charging device. The combination of the at least one guide rail and the receiving device functions as a flexible coupling or a slide-in, rear-engagement seat. A guide rail is advantageously provided as the guide element.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
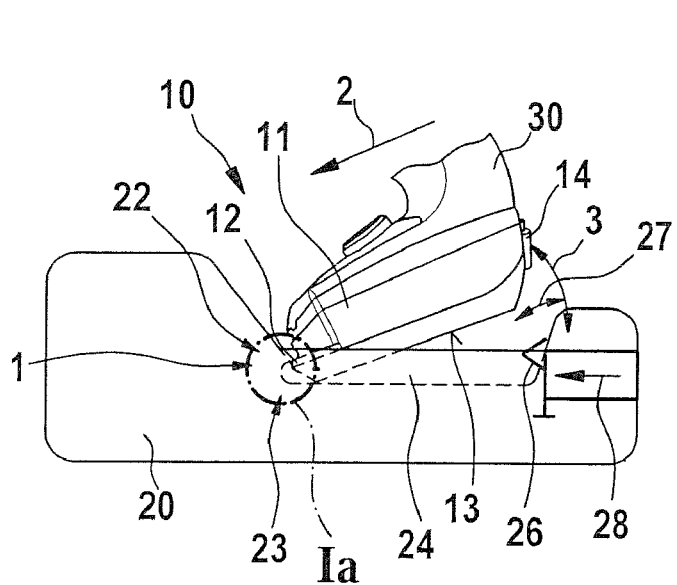
FIG. 1 is a schematic block diagram of a system for coupling an electrical supply unit with a charging device using a flexible coupling in accordance with the present invention.
Figure 2:
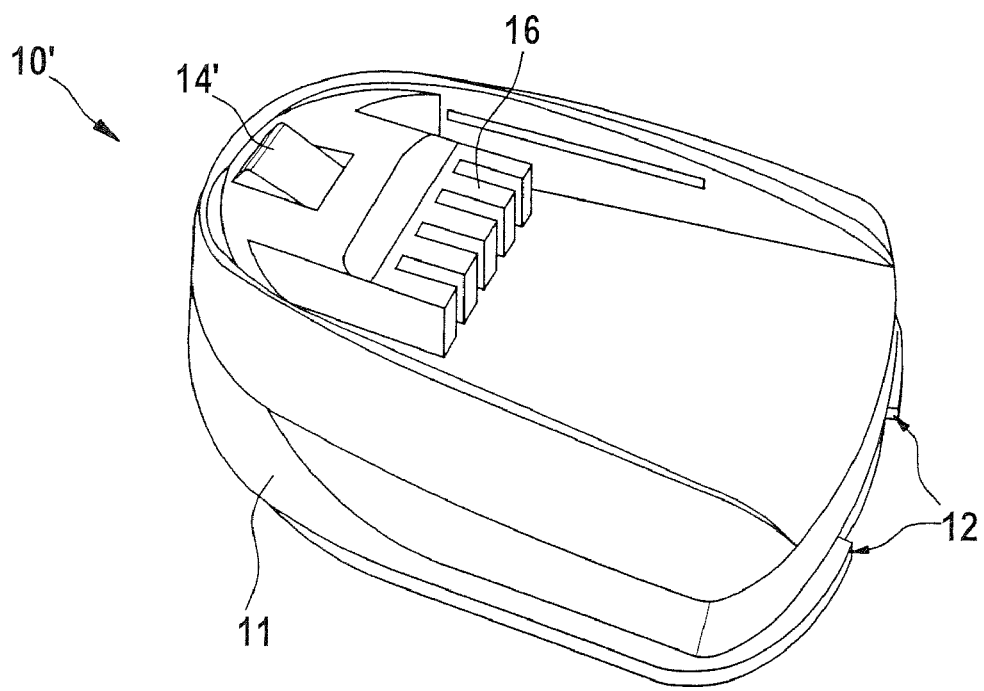
FIG. 2 is a perspective illustration of an electrical supply unit that has been separated from the electrical device in accordance with the present invention.

As shown in FIGS. 1 and 2, an inventive electrical supply unit 10, 10' for cordless electrical devices 30 includes a housing 11 for mechanically coupling with a charging device 20. Housing 11 includes at least one guide rail 12 in the front region and an actuating element 14, 14' in the rear region.

As also shown in FIG. 1, electrical supply unit 10 is connected with an electrical device 30 during the mechanical coupling with charging device 20. Electrical device 30 is shown as an example in FIG. 1, i.e., electrical supply unit 10 could also be integrated permanently in electrical device 30. Electrical supply unit 10, 10' can be used for mobile, portable devices such as power tools designed as cordless drills, cordless screwdrivers, gardening devices, etc.

FIG. 2 shows a supply unit 10' that has been separated from electrical device 30, with two guide rails 12 located in the front region, an actuating element 14' located in the rear region of supply unit 10', and electrical contacts 16, via which supply unit 10' can be contacted electrically with charging device 20 during a charging procedure. For cordless operation, associated electrical device 30 can be connected electrically with supply unit 10' via electrical connections 16.

As also shown in FIG. 1, an inventive charging device 20 includes—for mechanical coupling with electrical supply unit 10, 10'—a recess 24, on the one end of which a receiving device 22 is located, in which the at least one guide rail 12 of electrical supply unit 10, 10' can engage for mechanical coupling. A spring 26 that is designed, e.g., as an electrical contact spring, is located on the opposite end of receiving device 22. Actuating element 14, 14' located in the rear region of electrical supply unit 10, 10' therefore acts on spring 26—that can be deflected in the direction of double arrow 27—such that electrical supply unit 10, 10' is held in an end position in charging device 20 via spring contact force 28 of spring 26.

As also shown in FIG. 1, inventive system 1 includes—for mechanical coupling—at least one guide strip 12 that is located in the front region of housing 11 of electrical supply unit 10, 10', and corresponding receiving device 22 located on charging device 20. In order to mechanically couple electrical supply unit 10, 10' with charging device 20, guide rail 12 engages in corresponding receiving device 22; the combination of the at least one guide rail 12 and receiving device 22 functions as a flexible coupling 23. A region I a, in which flexible coupling 23 is located, is shown in a detailed illustration in FIG. 1a. In this illustration, guide rail 12 of housing 11 is coupled in receiving device 22. Due to the design of guide rail 12 and receiving device 22, flexible coupling 23 allows a swiveling motion to be carried out from a starting position downward into an end position, and from the end position upward into the starting position. The two possible swiveling directions are indicated in FIG. 1 as double arrow 3.

Figure 1A:
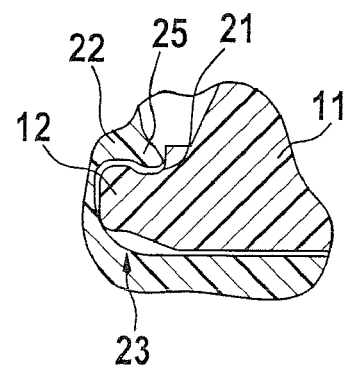
FIG. 1a is a detailed view of the flexible coupling in accordance with the present invention.

As shown in FIG. 1a, it is not possible in this exemplary embodiment to simply pull guide rail 12 out of receiving device 22, since, in the coupled state, a projection 25 of receiving device 22 engages in a recess 21 of the guide rail.

To mechanically couple electrical supply unit 10, 10' with charging device 20, the at least one guide rail 12 is inserted using a sliding motion in the direction of arrow 2 into corresponding receiving device 22, thereby resulting in starting position shown in FIG. 1. Supply unit 10, 10' is then pressed downward into the end position via the swiveling motion defined by flexible coupling 23. The end position is reached when a housing base 13 of supply unit 10 strikes a surface of recess 24 in charging device 20. Electrical supply unit 10, 10' is held in the end position by spring contact force 28 of spring 26. In the end position, electrical supply unit 10, 10' and charging device 20 are in electrical contact with each other via spring 26, which also serves as an electrical contact spring, thereby ensuring that the batteries (not shown) of electrical supply unit 10, 10' can be charged.

Figure 3:
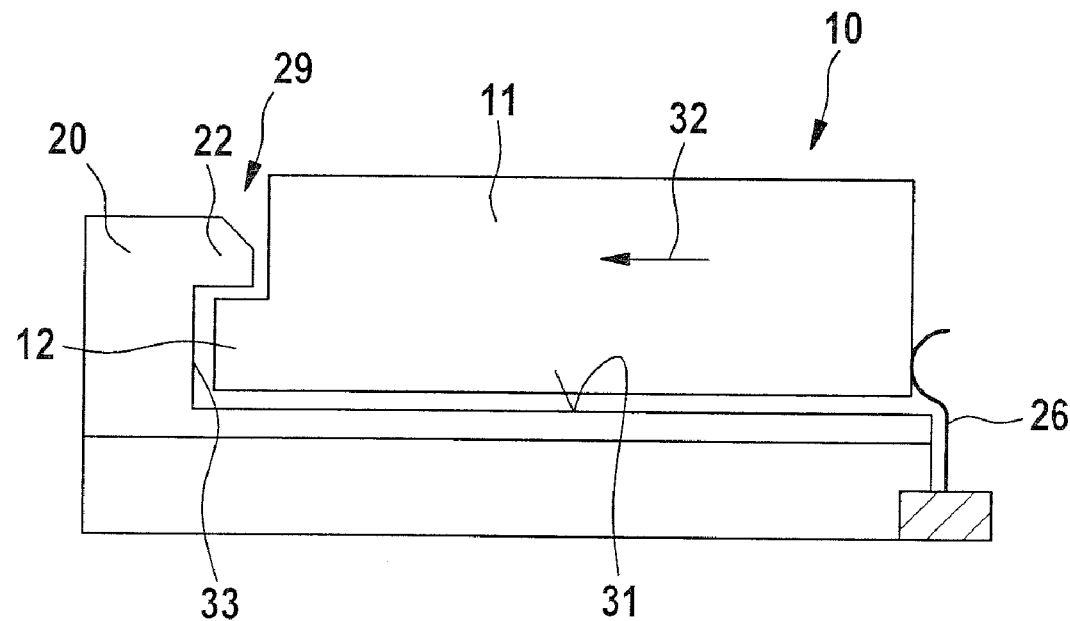
FIG. 3 is a schematic illustration of a system for coupling an electrical supply unit with a charging device using a slide-in, rear-engagement seat in accordance with the present invention.

FIG. 3 shows a schematic illustration of a system for coupling an electrical supply unit with a charging device using a slide-in, rear-engagement seat 29. The elements and components that are identical to those in the previous figures are labeled with the same reference numerals. Supply unit 10 in FIG. 1 is shown. Supply unit 10 includes guide rail 12 in the front region that engages in receiving device 22 of charging device 20. Guide rail 12 and receiving device 22 are designed such that guide rail 12 can be slid into receiving device 22 in only one direction. To this end, supply unit 10 or its housing 11 are placed on a surface 31 of charging device 20 and is then slid along on plane 31 in the direction of arrow 32 so that guide rail 12 is slid into receiving device 22.

Receiving device 22 includes a recess 33 with a rectangular cross section that accommodates guide rail 12, which also has a rectangular cross section. The dimensions of recess 33 and guide rail 12 are chosen such that housing 11 must be slid in direction of arrow 32 in order to couple housing 11 and charging device 20, or housing 11 must be slid in the direction opposite to arrow 32 to separate housing 11 and charging device 20. With this embodiment, it is therefore not possible to couple or separate housing 11 and supply unit 10 using a swiveling motion. Spring 26 that is designed, e.g., as an electrical contact spring, is located on the opposite end of receiving device 22 of charging device 20. Spring 26 acts on housing 11 of electrical supply unit 10 such that housing 11, with guide rail 12, is held in recess 33 and, therefore, against the charging device.

Figure 4:
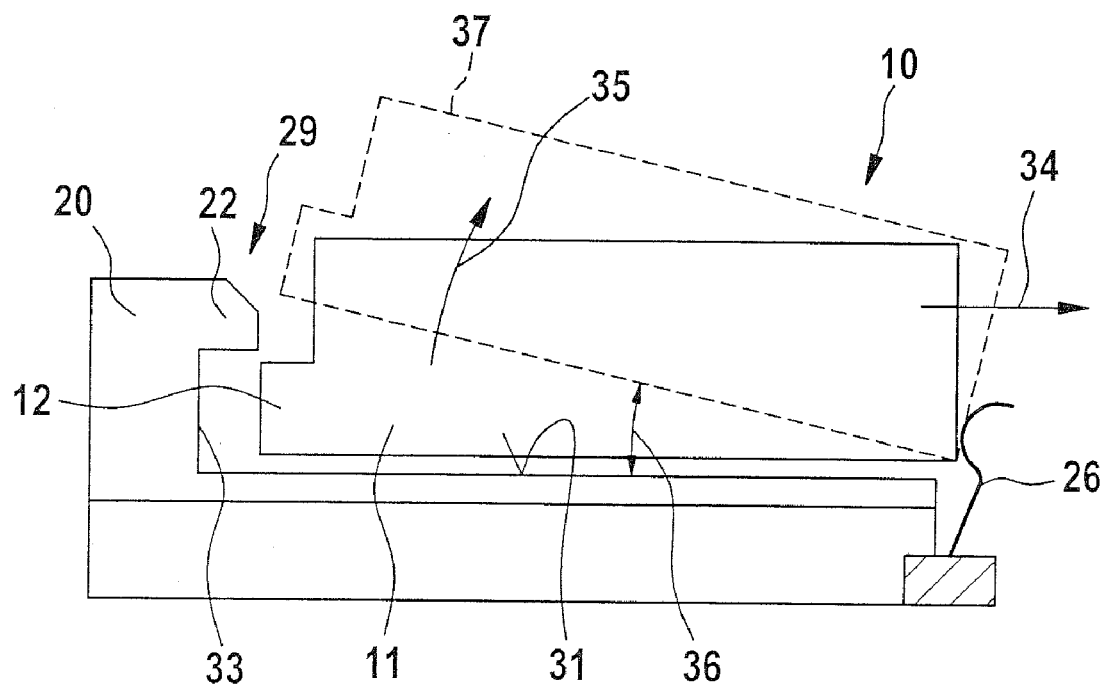
FIG. 4 shows the system in FIG. 3, in a decoupled state in accordance with the present invention.

FIG. 4 is a schematic illustration of the system in FIG. 3. In FIG. 4, the system is in a state that allows housing 11 to be detached from charging device 20. To this end, housing 11 is slid in the direction of arrow 34 against spring 26, so that guide rail 12 of housing 11 moves out of recess 33 of receiving device 22, and spring 26 is deflected. When guide rail 12 is moved out of recess 33, housing 11 can be swiveled, e.g., in the direction of arrow 35 in order to remove electrical supply unit 10 from charging device 20.

To insert housing 11 into charging device 20, e.g., housing 11 is placed on surface 31 of charging device 20 with its rear region at an angle 36, as illustrated by a dashed-line outline 37 of housing 11, thereby deflecting spring 26. Housing 11 is then tilted entirely onto surface 31 of charging device 20, so that guide rail 12 can be slid into recess 33 of receiving device 22.

Slide-in, rear-engagement seat 29, flexible coupling 23, and spring 26 are designed such that slide-in, rear-engagement seat 29 and flexible coupling 23 can become detached automatically. To this end, spring 26 is designed such that housing 11 automatically disengages from the slide-in, rear-engagement seat and/or the flexible coupling when the charging device and housing 11 are acted upon by a critical burst of force, e.g., when they are dropped onto a hard surface. To this end, spring contact force 28 of spring 26 is selected such that spring 26 can not be deflected until a certain level of force has been applied—which can also be applied intentionally, of course, by moving the housing—so that housing 11 can be detached from the charging device. Spring 26 can be deflected so far that guide rail 12 can come out of receiving device 22. With flexible coupling 23, deflectable spring 26 initially makes it possible for the housing to perform a swiveling motion, so that guide strip 12 can disengage from receiving device 22.

It will be understood that each of the elements described above, or two or more together, may also find a useful application in other types of constructions differing from the type described above.

While the invention has been illustrated and described as embodied in a mechanical coupling system, associated electrical supply unit, and associated charging device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A system for mechanically coupling an electrical supply unit for cordless electrical devices with a charging device, with which the electrical supply unit is located in a housing in which at least one battery is located that is rechargeable by the charging device, the system comprising the housing which includes at least one guide element engaging for mechanical coupling with the charging device, in a corresponding receiving device in the charging device, said at least one guide element and said receiving device being configured so that they function in combination as an element selected from the group consisting of a flexible coupling and a slide-in, rear-engagement seat and so that the mechanical coupling of the electrical supply unit with the charging device takes place by sliding said at least one guide rail of the electrical supply unit into said receiving device of the charging device in a starting position, and then swiveling the supply unit downwards into an end position, wherein the end position is reached when a housing base of the supply unit comes in contact with a surface of a receiving device in the charging device.

2. The system for mechanically coupling as defined in claim 1, where said at least one guide rail is locatable in a front region of the housing.

3. The system as defined in claim 1, wherein said at least one guide rail and said receiving device are configured so that said flexible coupling allows a swiveling motion to be carried out from a starting position downwards into an end position, and from the end position upwards into the starting position.

4. The system as defined in claim 1, further comprising means for providing a spring contact force which holds the electrical supply unit in the end position.

5. The system as defined in claim 4, wherein said means for providing a spring contact force is configured as an electrical contact spring which is acted upon by an actuating element located on the housing of the electrical supply unit.

6. A system as defined in claim 1, wherein said at least one guide rail and said receiving device are configured so that in the end position the electrical supply unit and the charging device are in electrical contact, thereby enabling the batteries to be charged.

7. The system as defined in claim 1, further comprising a spring which provides a spring contact force for holding the electrical supply unit in an end position and which is deflectable to an extent that said guide rail can disengage from said receiving device.

8. An electrical supply unit for cordless electrical devices with a housing in which at least one rechargeable battery is located, comprising at least one guide element provided in the housing and engaging for mechanical coupling in a corresponding receiving device of a charging device, said at least one guide element and said receiving device being configured so that they function in a combination as an element selected from the group consisting of a flexible coupling and a slide-in, rear-engagement seat and so that the mechanical coupling of the electrical supply unit with the charging device takes place by sliding said at least one guide rail of the electrical supply unit into said receiving device of the charging device in a starting position, and then swiveling the supply unit downwards into an end position, wherein the end position is reached when a housing base of the supply unit comes in contact with a surface of a receiving device in the charging device.

9. The electrical supply unit for cordless electrical devices as defined in claim 8, wherein said at least one guide rail is located in a front region of the housing.

10. The electrical supply unit as defined in claim 8, and further comprising an actuating element located in a rear region of the housing such that a spring is actuated in a charging device, by way of which the housing is held in an end position in the charging device.

11. The electrical supply unit as defined in claim 10, wherein said spring is configured as an electrical contact spring.

12. A charging device for an electrical supply unit for cordless electrical devices, comprising a receiving device into which at least one guide element located on the electrical supply unit engages to mechanically couple the electrical supply unit with a charging device, said at least one guide element and said receiving device being configured so that they function in combination as an element selected from the group consisting of a flexible coupling and a slide-in, rear-engagement seat and so that the mechanical coupling of the electrical supply unit with the charging device takes place by sliding said at least one guide rail of the electrical supply unit into said receiving device of the charging device in a starting position, and then swiveling the supply unit downwards into an end position, wherein the end position is reached when a housing base of the supply unit comes in contact with a surface of a receiving device in the charging device.

13. The charging device for an electrical supply unit for cordless electrical devices as defined by claim 12, wherein said at least one guide rail is located in a front region of the electrical supply unit.

14. The charging device as defined in claim 12, further comprising a spring that acts on an actuated element located in a rear region of the electrical supply unit for holding the electrical supply unit in an end position in the charging device via a spring contact force, in which a housing base of the electrical supply unit rests on a surface of a recess in the charging device.

15. The charging device as defined in claim 14, wherein said spring is configured so as to be deflectable to an extent that said guide rail is disengageable from the receiving device.

* * * * *